(12) United States Patent
Heitzenrater et al.

(10) Patent No.: US 9,915,007 B2
(45) Date of Patent: Mar. 13, 2018

(54) ELECTRO CERAMIC COATED ALUMINUM TRANSMISSION COMPONENTS

(71) Applicant: GM Global Technology Operations LLC, Detroit, MI (US)

(72) Inventors: Scott W. Heitzenrater, Orion, MI (US); Daniel R. White, Fenton, MI (US); Carlos E. Marin, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 14/753,967

(22) Filed: Jun. 29, 2015

(65) Prior Publication Data

US 2016/0376720 A1    Dec. 29, 2016

(51) Int. Cl.
| | |
|---|---|
| *F16D 13/68* | (2006.01) |
| *C25D 9/12* | (2006.01) |
| *C25D 7/00* | (2006.01) |
| *F16D 49/02* | (2006.01) |
| *F16H 57/02* | (2012.01) |
| *F16H 57/032* | (2012.01) |
| *C25D 9/06* | (2006.01) |
| *F16D 13/76* | (2006.01) |
| *F16D 25/0638* | (2006.01) |

(52) U.S. Cl.
CPC .............. *C25D 9/12* (2013.01); *C25D 7/00* (2013.01); *C25D 9/06* (2013.01); *F16D 13/683* (2013.01); *F16D 13/76* (2013.01); *F16D 49/02* (2013.01); *F16H 57/02* (2013.01); *F16H 57/032* (2013.01); *F16D 25/0638* (2013.01); *F16H 2057/02017* (2013.01); *F16H 2057/02047* (2013.01)

(58) Field of Classification Search
CPC .............. F16D 13/683; F16D 25/0638; F16D 2069/003; F16D 2200/003; F16D 13/68; C25D 9/12
See application file for complete search history.

(56) References Cited

U.S. PATENT DOCUMENTS

| | | | |
|---|---|---|---|
| 5,048,654 A | 9/1991 | Yesnik | |
| 5,452,784 A * | 9/1995 | Miyoshi | F16D 13/52 106/36 |

\* cited by examiner

*Primary Examiner* — Huan Le

(57) ABSTRACT

The present invention is directed to apply plates, clutch plates, reaction plates and backing plates utilized of friction clutch packs, brake housings, clutch hubs, clutch housings, accumulators, spline sets, valve bodies and wear surfaces against which bushings, seals, springs and similar components slide and contact which are utilized in motor vehicle automatic transmissions, are fabricated of aluminum and include an electro ceramic coating deposited thereon. Such components exhibit reduced weight relative to similar components fabricated of steel as well as extended service life due to both the hardness and porosity of the ceramic coating.

14 Claims, 11 Drawing Sheets

ELECTRO CERAMIC COATED ALUMINUM TRANSMISSION COMPONENTS

FIELD

The present disclosure relates to electro ceramic coated aluminum components and more particularly to electro ceramic coated aluminum components such as clutch hubs, clutch and brake housings, plates and similar components utilized in motor vehicle powertrains, particularly transmissions.

BACKGROUND

The statements in this section merely provide background information related to the present disclosure and may or may not constitute prior art.

Many motor vehicle powertrain components have been and are fabricated of steel because of its strength, malleability, cost and availability. This is not to say, however, that all its engineering attributes are positive or desirable. One of its most commonly recognized drawbacks is its weight, especially when compared to materials such as aluminum and magnesium.

A conventional motor vehicle automatic transmission may include one or more friction clutch assemblies, planetary gear assemblies, band brakes, accumulators, spline sets, valve bodies and wear surfaces engaged by bushings, seals, springs and similar components. A conventional friction clutch includes a friction clutch pack having alternating friction plates and reaction plates, both typically fabricated of steel, disposed between an apply plate and a backing plate against which the friction clutch pack is compressed. When compressed, torque is transferred through the friction clutch pack between an inner hub and an outer housing. Band brakes comprehend a circumferential band having friction material which partially encircles a rotating cylindrical body which may be a housing or similar component. One end of the brake band is fixed and the other end is coupled to an actuator which tightens the band about the cylindrical body.

Between the clutch hub or housing and other components such as shafts, quills or planetary gear components, it is often necessary to establish a fluid tight seal in order to either separate fluid filled, i.e., wet, areas from dry areas or to establish a flow path for fluid across or between rotating and non-rotating components. This may be achieved by, in the first case, a resilient seal disposed in a channel or groove between the areas or, in the second case, utilizing a pair of resilient seals disposed in grooves on both sides of the flow path to properly direct fluid flow. Also, one or both of the inner hub and outer housing may be coupled to a shaft or quill by splines.

Conventionally, friction clutch plates, band brake cylinders, hubs, housings, spline sets and components having surfaces engaged by friction material or resilient seals have been fabricated of various steels due to the strength and durability these materials. Not only does steel provide the structural integrity necessary to carry the torque loads encountered by such components but it also provides the durability of the faces or surfaces exposed to frictional (sliding) forces. As noted, the primary drawback of such steel clutch components is weight. However, since many of these transmission components both contribute to the total vehicle weight and rotate and thus contribute to powertrain energy loss as they are repeatedly accelerated and decelerated, they twice contribute to fuel consumption. Accordingly, any weight reduction of a rotating component, such as a clutch or other transmission component, positively affects fuel consumption, both from the standpoint of total vehicle weight as well as powertrain efficiency.

One solution to the weight problem is the substitution of a lighter weight material such as aluminum or magnesium. Aluminum has about one-third the density of steel and exhibits good heat transfer, both characteristics being important in transmissions, especially clutches and brakes. However, it has been found that this material is unsuitable because the surfaces exposed to frictional forces during clutch and brake engagement as well as those exposed to sliding forces such as seals and valve surfaces exhibit unacceptable wear and thus unacceptable service life.

SUMMARY

The present invention is directed to apply plates, clutch plates and reaction plates utilized of friction clutch packs, brake housings, clutch hubs, clutch housings, accumulators, spline sets, valve bodies and wear surfaces against which bushings, seals, springs and similar components slide and contact which are utilized in motor vehicle automatic transmissions and are fabricated of aluminum which include an electro ceramic coating deposited thereon. Such components exhibit reduced weight relative to similar components fabricated of steel as well as extended service life due to both the hardness and porosity of the ceramic coating.

Thus it is an aspect of the present invention to provide an apply plate for a friction clutch pack having an electro ceramic coating on one surface.

It is a further aspect of the present invention to provide a reaction plate for a friction clutch pack having an electro ceramic coating on both surfaces.

It is a still further aspect of the present invention to provide a backing plate for a friction clutch pack having an electro ceramic coating on one surface.

It is a still further aspect of the present invention to provide a band brake assembly having an electro ceramic coating on an outer surface of a cylindrical body.

It is a still further aspect of the present invention to provide a accumulator having an aluminum housing and an electro ceramic coating on an inner surface.

It is a still further aspect of the present invention to provide bushing interface surfaces on aluminum hubs and housings having an electro ceramic coating.

It is a still further aspect of the present invention to provide spring wear surfaces on aluminum pistons and dams having an electro ceramic coating.

It is a still further aspect of the present invention to provide seal grooves and seal surfaces adjacent fluid passageways in clutch feed hubs and housings having an electro ceramic coating.

It is a still further aspect of the present invention to provide male and female spline surfaces on aluminum clutch housings and hubs having an electro ceramic coating.

It is a still further aspect of the present invention to provide thrust surfaces on aluminum hub, housings and supports having an electro ceramic coating.

It is a still further aspect of the present invention to provide an aluminum valve body with bore surfaces having an electro ceramic coating.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 12:
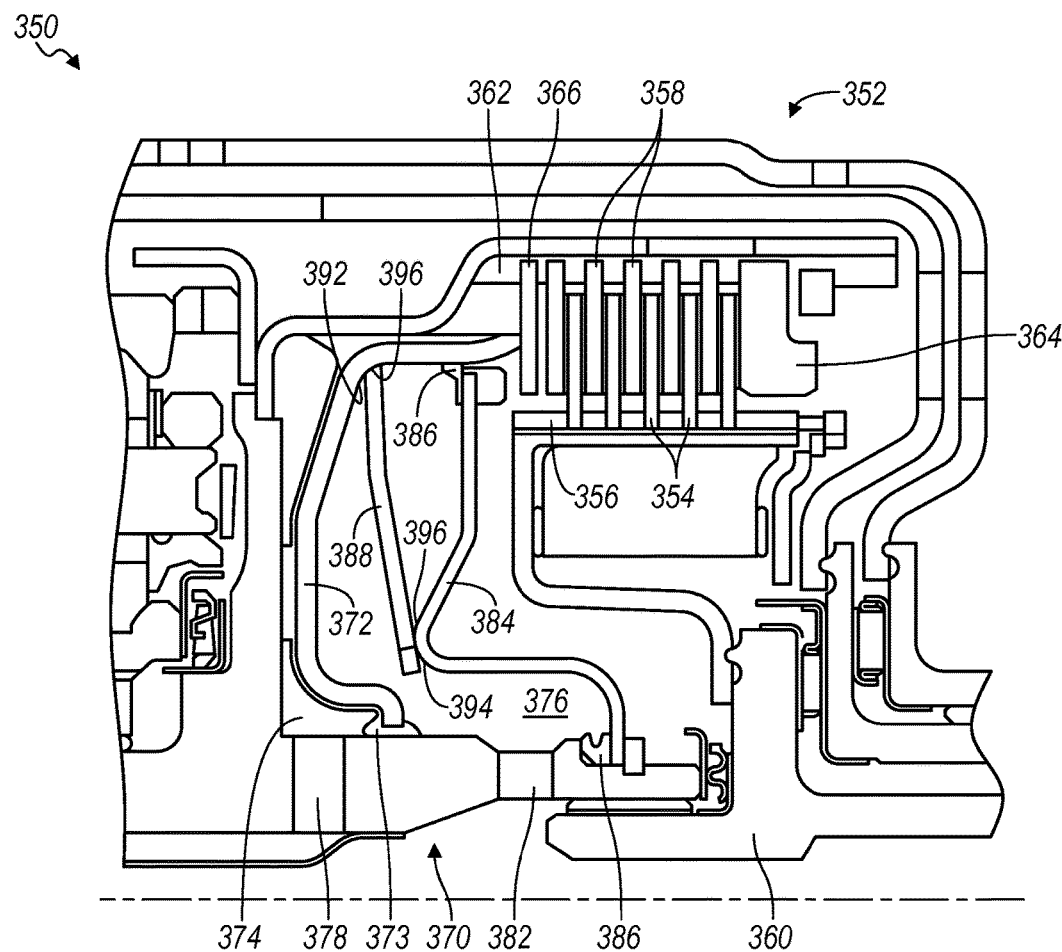
FIG. 12 is a full sectional view of a portion of an automatic transmission including a friction clutch pack and hydraulic actuator having an electro ceramic coating on wear surfaces according to the present invention.
Figure 13:
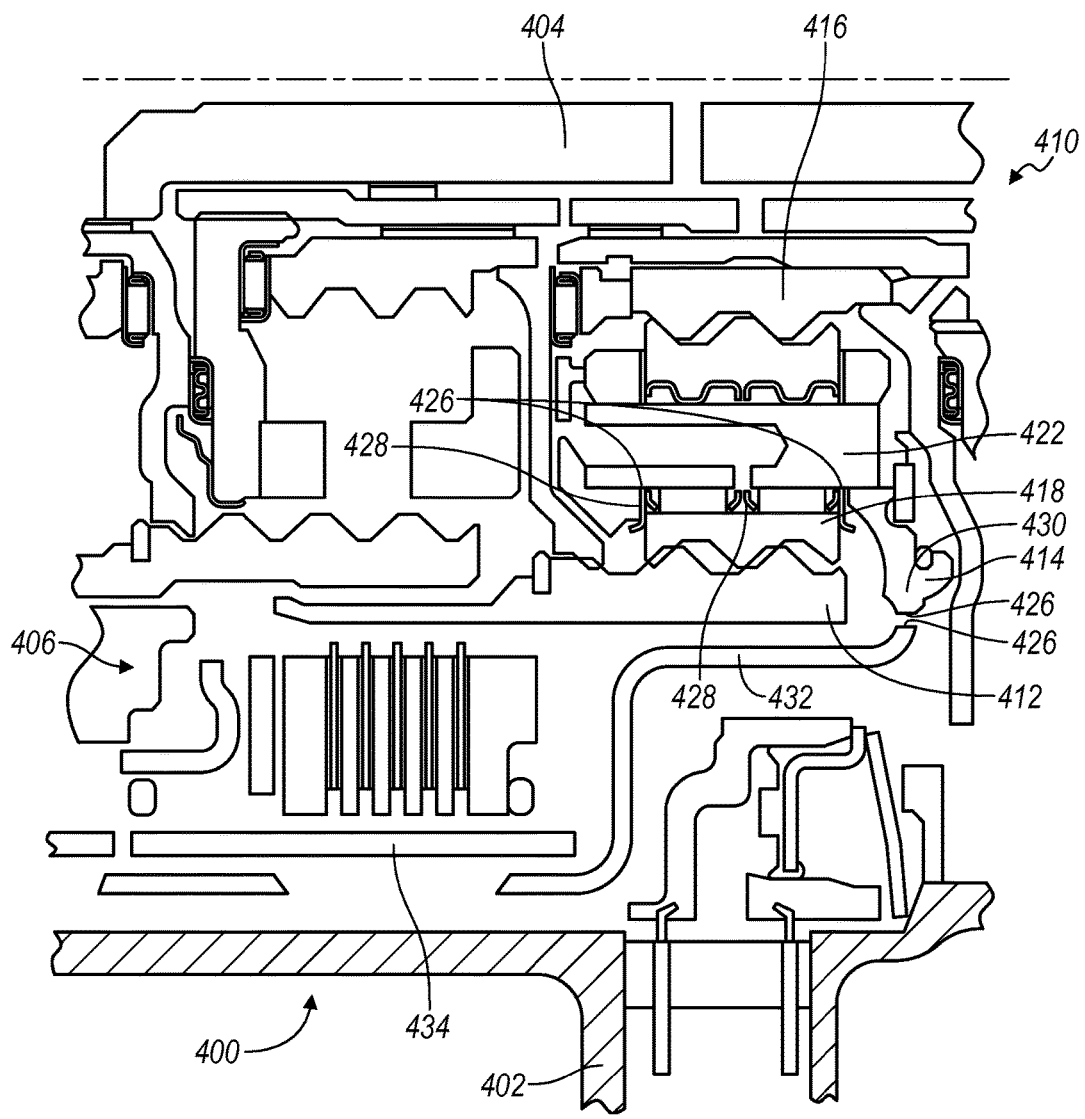
Figure 14:
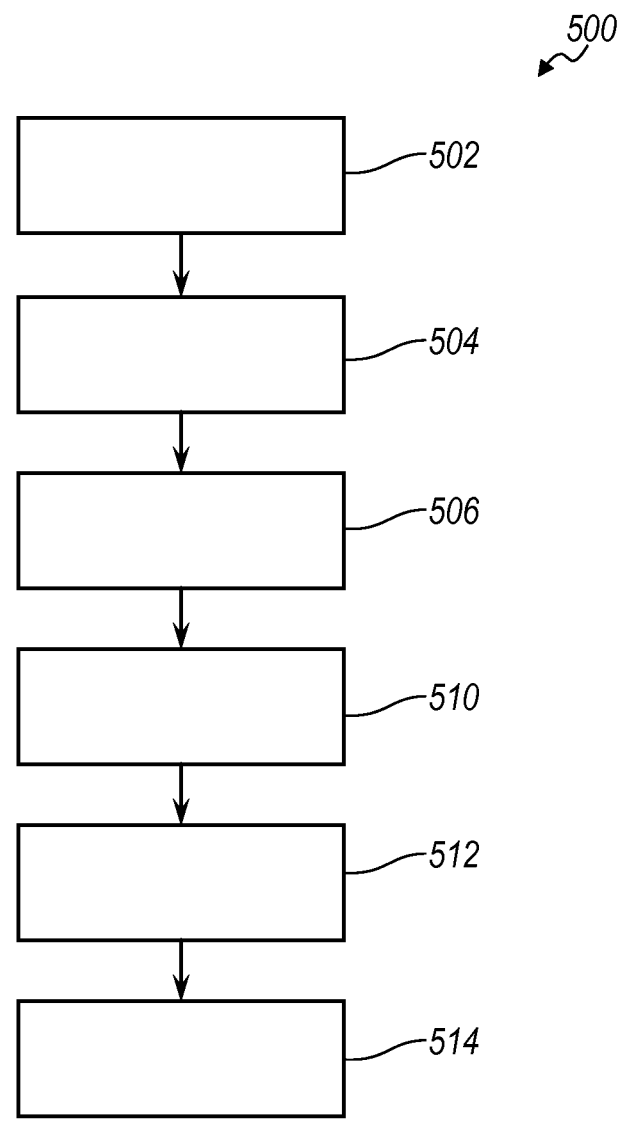

FIG. 13 is a full sectional view of a portion of an automatic transmission including a friction clutch pack, hydraulic actuator and planetary gear assembly having an electro ceramic coating on wear surfaces according to the present invention; and FIG. 14 is a flow chart illustrating the steps undertaken to provide an electro ceramic coating on the aluminum components illustrated in FIGS. 1 through 13.

DETAILED DESCRIPTION

The following description is merely exemplary in nature and is not intended to limit the present disclosure, application, or uses.

Figure 1:
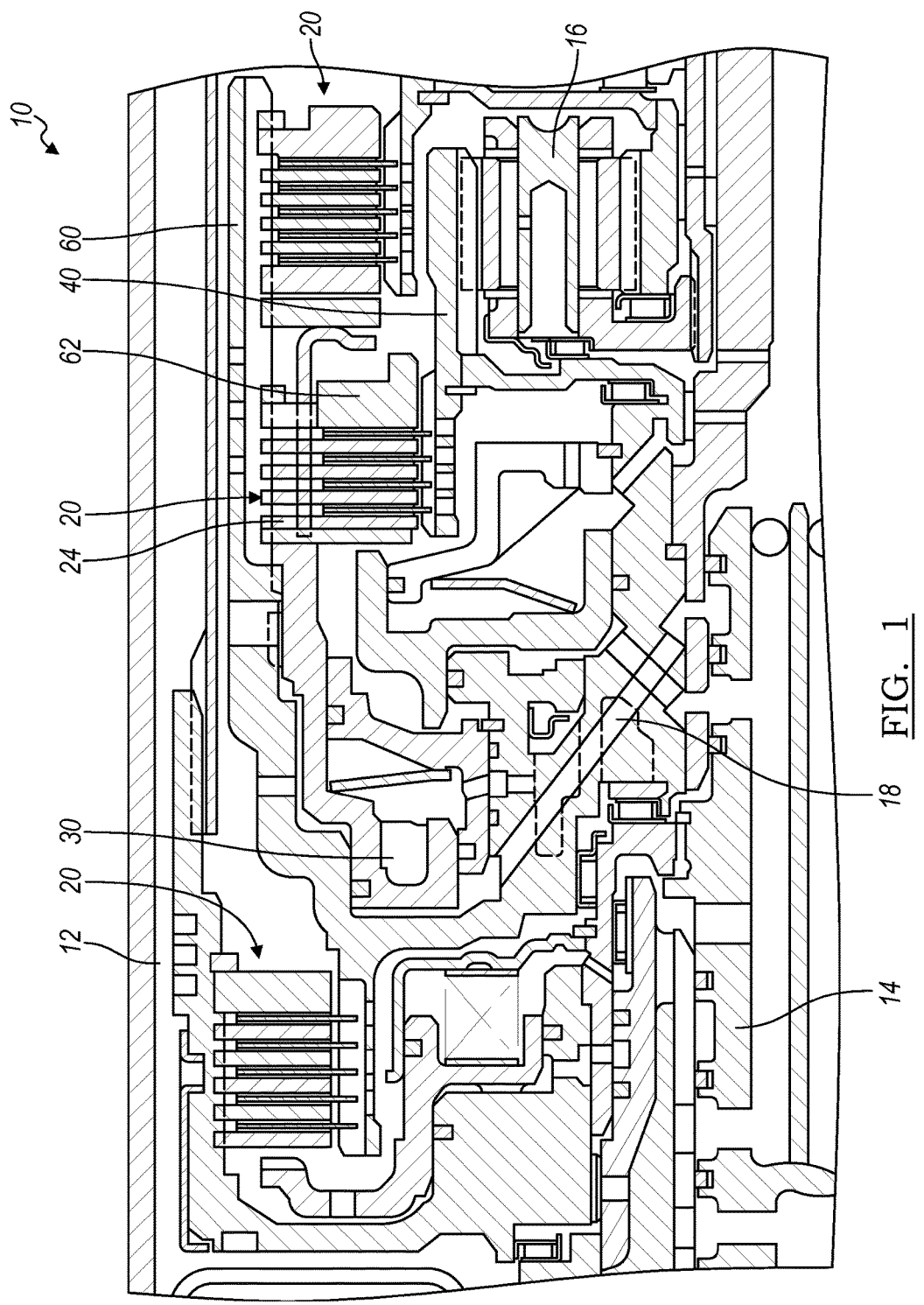
FIG. 1 is a fragmentary sectional view of a portion of an automatic transmission including a friction clutch pack having components including an electro ceramic coating.

With reference to FIG. 1, a portion of a motor vehicle automatic transmission is illustrated and generally designated by the reference number 10. The automatic transmission 10 includes a housing 12 which mounts, supports, positions and protects various components such as shafts and quills 14, a plurality of planetary gear assemblies 16, one of which is illustrated in FIG. 1, fluid passageways 18 and a plurality of friction clutch assemblies 20.

Figure 2:
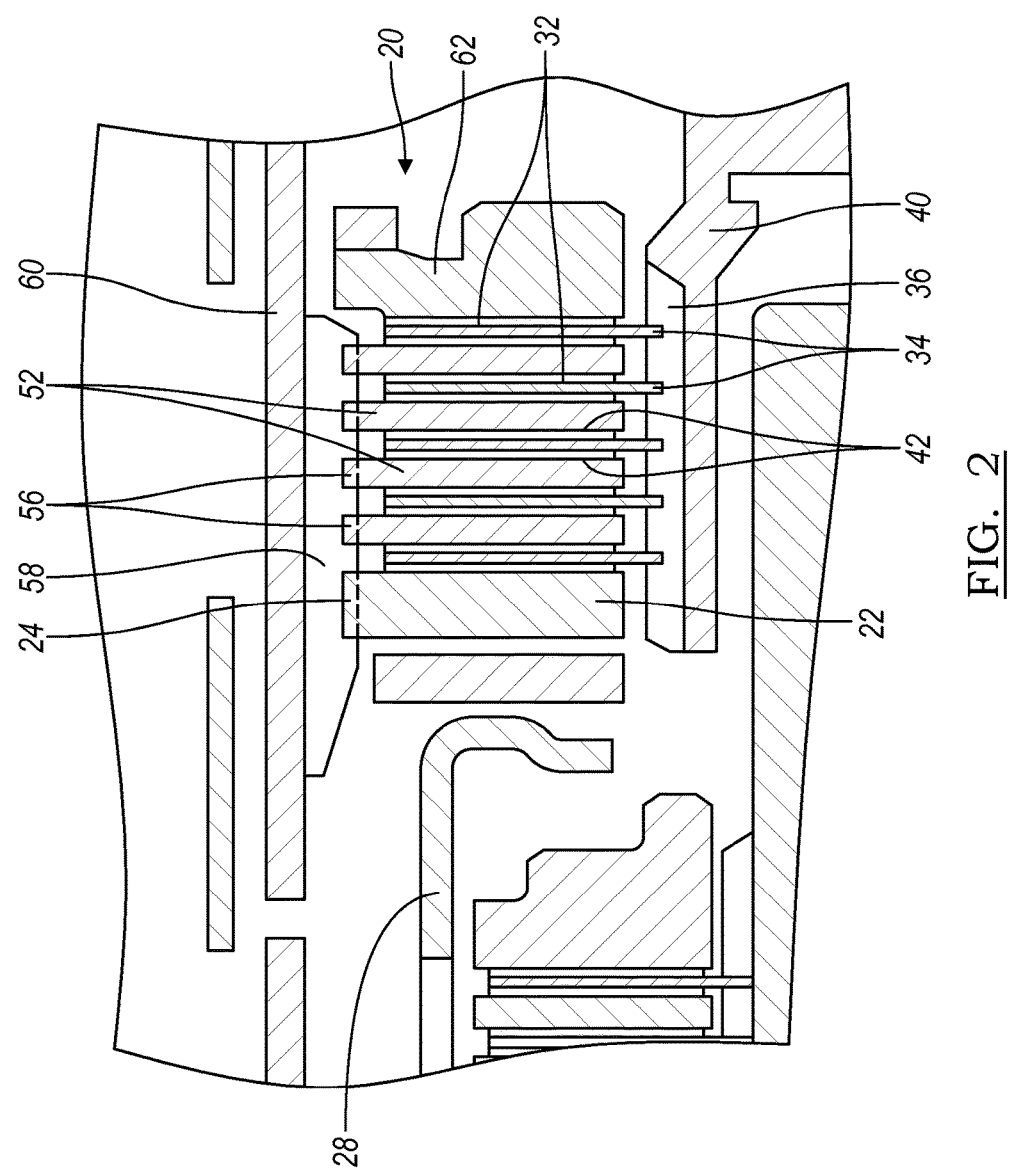
FIG. 2 is an enlarged sectional view of a portion of a friction clutch pack assembly including an apply plate, reaction plates and a backing plate including an electro ceramic coating.

Referring now to FIGS. 1 and 2, the friction clutch pack assemblies 20 include an apply plate 22 having male splines 24 disposed about its periphery which engage a plurality of female splines 58 within an outer housing 60 and thus rotate therewith. The apply plate 22 is acted upon and axially translated by a linkage or member 28 driven by a hydraulic operator or actuator 30. The friction pack assemblies 20 also include a first plurality of friction plates or discs 32 having female splines 34 which engage complementary male splines 36 on an inner hub 40 and thus rotate therewith. The first plurality of friction plates or discs 32 are conventional and include friction facing material 42 on both faces or surfaces. The first plurality of friction plates or discs 32 are interleaved with a second plurality of reaction plates or discs 52. The reaction plates or discs 52 include male splines 56 disposed about their peripheries which are complementary to and engage the plurality of female splines 58 within the outer housing 60 and thus rotate therewith. At the opposite end from the apply plate 22 is a backing plate 62 against which the friction plates 32 and reaction plates 52 are compressed by the hydraulic operator 30. When so compressed, torque may be transmitted between the inner hub 40 and the outer housing 60.

Figure 3:
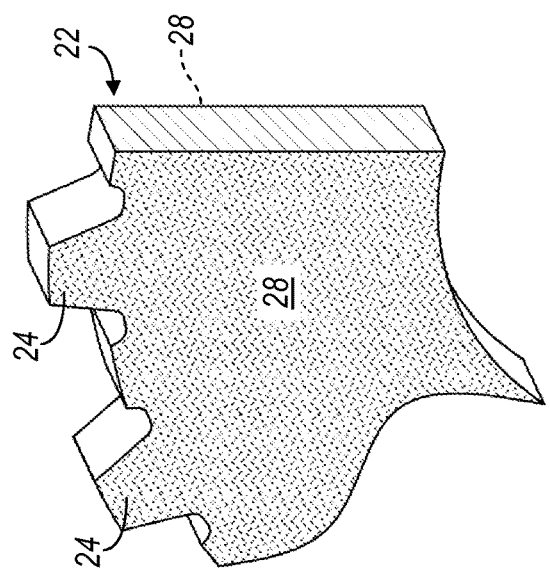
FIG. 3 is an enlarged fragmentary perspective view of an aluminum apply plate including electro ceramic coatings on both faces according to the present invention.

Referring now to FIG. 3, the apply plate 22 is stamped or extruded of aluminum or an aluminum alloy, or may be powdered metal (PM) aluminum and, as stated above, includes male splines 24 about its periphery. The front and rear faces or surfaces of the apply plate 22 include an electro ceramic coating 28. The electro ceramic coating 28 is preferably a material such as titanium dioxide and is applied by the process described below. The approximate thickness of the ceramic coating 28 may from 0.005 to 0.050 mm. (0.000197 to 0.00197 inches), but it may be thicker or thinner as needed for performance.

Figure 4:
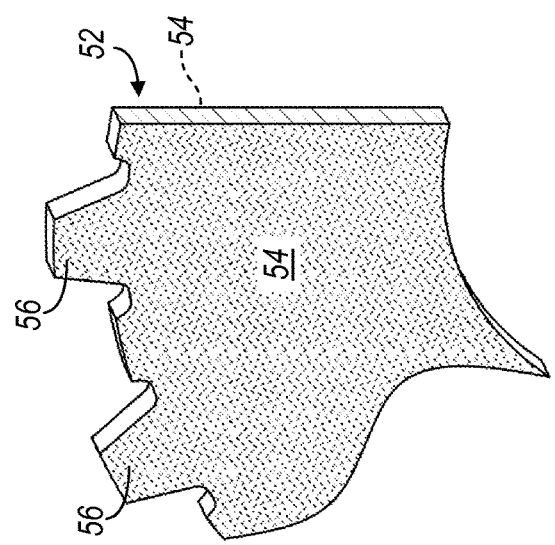
FIG. 4 is an enlarged fragmentary perspective view of an aluminum reaction plate including electro ceramic coatings on both faces according to the present invention.

Referring now to FIG. 4, the reaction plate or disc 52 is also stamped or extruded aluminum or an aluminum alloy and, as stated above, includes male splines 56 about its periphery. Typically, the reaction plate or disc 52 is between about 1.5 mm. to 3.0 mm. (0.059 to 0.118 inches) in thickness. The front and rear faces or surfaces of the reaction plate or disc 52 also include an electro ceramic coating 54. The electro ceramic coating 54 may be applied to the aluminum or aluminum sheet stock before stamping, if desired. The electro ceramic coating 54 is preferably titanium dioxide and is applied by and through the process described below. The approximate finished thickness of the ceramic coating is 0.005 to 0.050 mm. (0.000197 to 0.00197 inches) but may be thicker or thinner.

Figure 5:
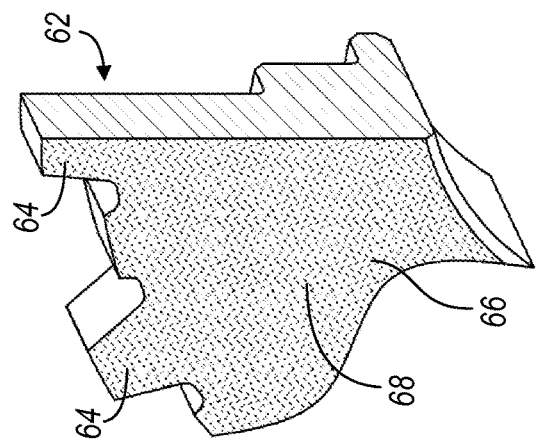
FIG. 5 is an enlarged fragmentary perspective view of a powdered metal aluminum backing plate including a electro ceramic coating on one face according to the present invention.

Referring now to FIG. 5, the backing plate 62 also includes male splines 64 which are complementary to and engage the female splines 58 within the outer housing 60 and thus it rotates with the outer housing 60. The backing plate 62 is preferably fabricated of powdered metal (PM) aluminum, stamped and machined aluminum, forged and machined aluminum or extruded aluminum. The front face or surface 66 of the backing plate 62 also includes an electro ceramic coating 68. The approximate finished thickness of the ceramic coating is 0.005 to 0.050 mm. (0.000197 to 0.00197 inches) but may be thicker or thinner.

It should be appreciated the with regard to the apply plates 22, the reaction plates 52 and the backing plates 62, no secondary surface finishing is needed for thin to medium thickness electro ceramic coatings 28, 54 and 68 but secondary surface finishing after coating may be desirable to tailor the micro surface finish to provide a smoother or rougher micro surface finish to improve clutch friction carrying ability and clutch feel.

Because the apply plates 22, the reaction plates 52 and the backing plates 62 having surfaces with an electro ceramic coating according to the present invention replace or retrofit, both functionally and dimensionally, previously utilized components, they may be readily installed in place of such components. Thus, without requiring other engineering or design changes, the benefits they confer, primarily weight and energy savings, are immediately available. For example, in one automatic transmission, substitution of the apply plates 22, the reaction plates 52 and the backing plates 62 in the several clutches results in a weight saving of 1.8 Kg. (3.97 pounds).

Figure 6:
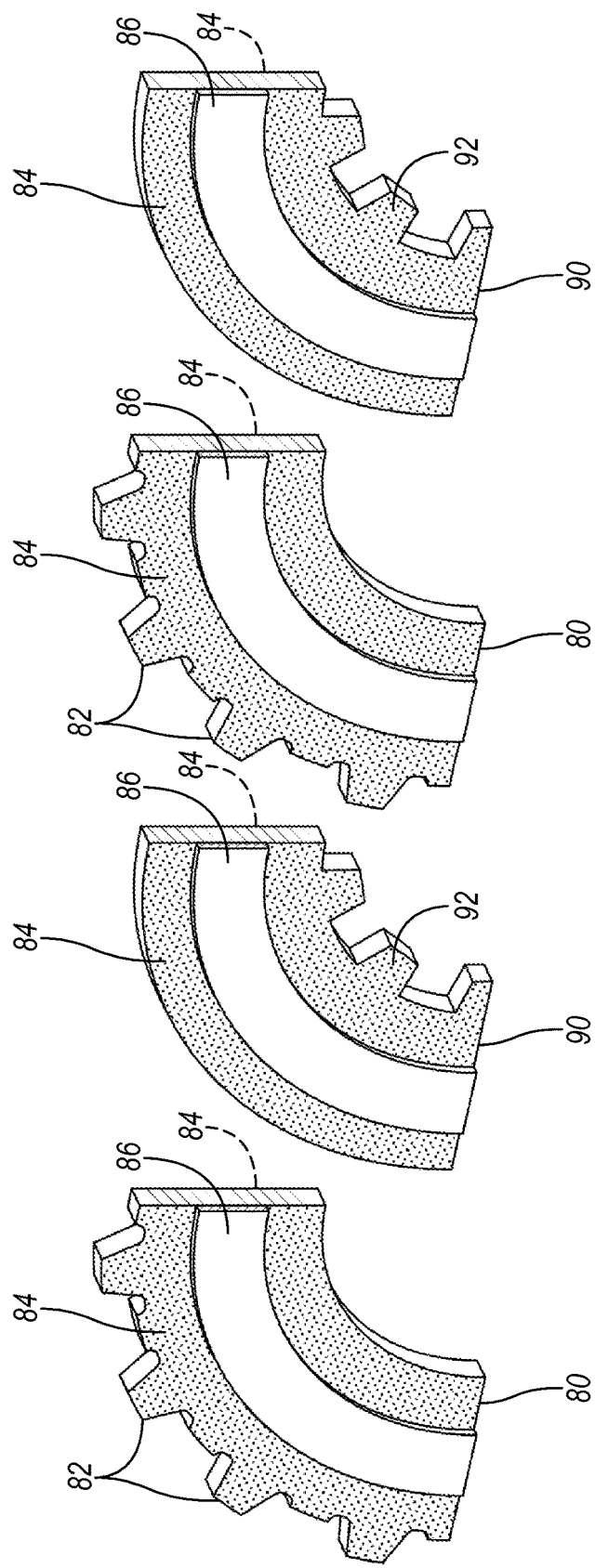
FIG. 6 is an enlarged fragmentary perspective view of single sided aluminum clutch plates and reaction plates including electro ceramic coatings on both faces and friction material on one face according to the present invention.

With reference now to FIGS. 2 and 6, as an alternative to friction clutches having a plurality of friction plates 32 including friction material 42 on both faces alternating with reaction plates 52, certain friction clutches utilize single sided friction plates 80 having male splines 82 and an electro ceramic coating 84 on both faces or surfaces and friction facing material 86 on only one face or surface. The single sided aluminum or aluminum alloy friction plates 82 are interleaved with a like plurality of aluminum or aluminum alloy reaction plates 90 having female splines 92 and an electro ceramic coating 84 on both faces or surfaces and friction material 86 on only one face or surface. The electro ceramic coating 84, which is also preferably applied to the splines 82 and 92, on these single sided plates 80 and 90 provides an excellent surface upon which an adhesive and the friction material 86 is applied.

It will be appreciated that in addition to disclosing single sided clutch plates, FIG. 6 illustrates components for what is referred to as an inverted clutch design wherein the friction plates 80 include male splines 82 which mate with the splines 58 on the outer housing 60 and the reaction plates 90 include female spines 92 which mate with the male splines 36 on the inner hub 40. It should be understood that either arrangement of the friction facing material 42 and 86, i.e., single sided or double sided, may be utilized with either the conventional friction clutch configuration of FIGS. 1 and 2 or the inverted configuration of FIG. 6.

Figure 7:
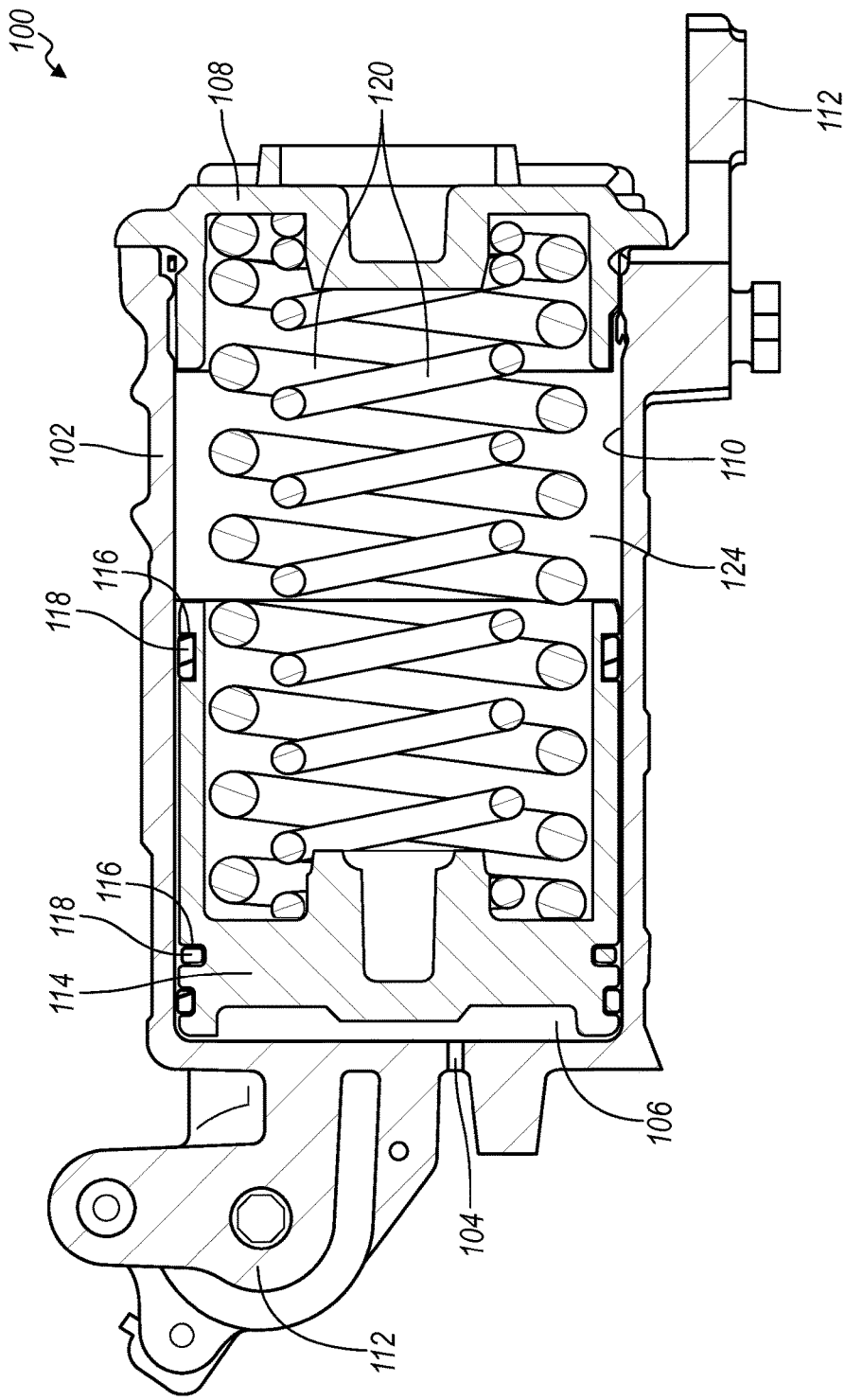
FIG. 7 is a full sectional view of a fluid accumulator utilized in, for example, an automatic transmission having an inner surface coated with an electro ceramic coating according to the present invention.

Referring now to FIG. 7, a fluid accumulator 100 which may be a component of the automatic transmission 10 of FIG. 1 includes a cylindrical housing 102 having a substantially closed end having an inlet/outlet port 104 which communicates with a fluid chamber 106, an open end which is closed and sealed by a threaded end plug 108 and cylindrical interior wall or surface 110. The housing 102 may include various mounting or attachment members such as the arms 112. Disposed within the cylindrical housing 102 is a piston 114 having one or more circumferential grooves 116 which receive elastomeric seals 118 which contact and seal against the cylindrical interior wall or surface 110. Between the piston 114 and the end plug 108 are a pair of concentrically disposed compression springs 120. In conventional fashion, the compression springs 120 provide a biasing force to the piston 114 in the direction of the inlet/outlet port 104. When fluid pressure in the chamber 106 overcomes the force of the springs 120, the piston moves to the right in FIG. 7, enlarging the volume of the fluid chamber 106 and vice versa. The cylindrical interior wall or surface 110 includes an electro ceramic coating 124 having a thickness of between 005 to 0.050 mm. (0.000197 to 0.00197 inches) or more or less depending upon engineering considerations which is applied as described below.

Figure 8:
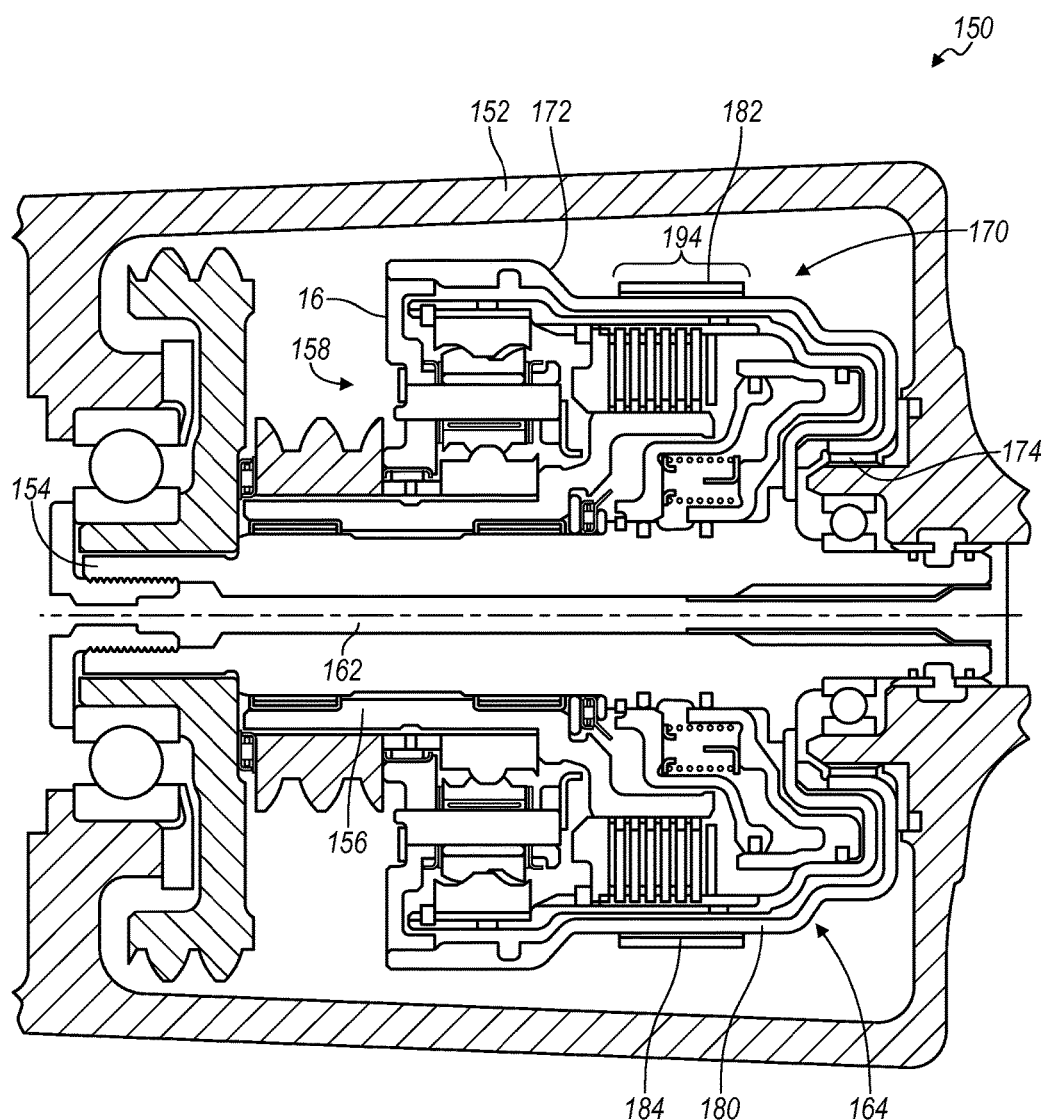
FIG. 8 is a full sectional view of a portion of an automatic transmission having a band brake assembly with an outer drum or housing surface coated with an electro ceramic coating according to the present invention.
Figure 9:
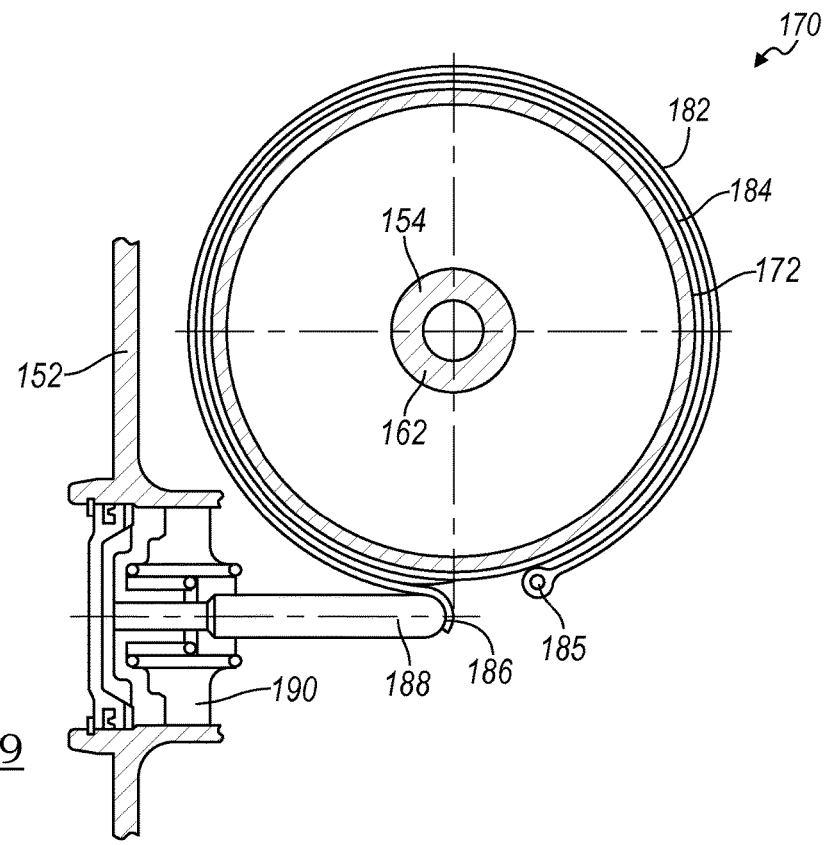
FIG. 9 is a schematic end view of the band brake drum assembly of FIG. 8 with an outer drum or housing surface coated with an electro ceramic coating according to the present invention.

Referring now to FIGS. 8 and 9, a portion of another motor vehicle automatic transmission is illustrated and generally designated by the reference number 150. The automatic transmission 150 includes a housing 152 which mounts, positions and protects various components such as an input shaft 154, a concentric quill 156, a plurality of planetary gear assemblies 158, one of which is illustrated in FIG. 8, fluid passageways 162 and a plurality of friction clutch assemblies 164, one of which is also illustrated in FIG. 8.

The automatic transmission 150 also includes a band brake assembly 170 which generally surrounds the aforementioned components which rotate on the axis of the input shaft 154 and the quill 156. The band brake assembly 170 includes a bell or cylindrical housing 172 which is supported on an anti-friction bearing 174 such as a ball or roller bearing assembly and is coupled for rotation with a component such as a planet gear carrier 176 of the planetary gear assembly 158. The cylindrical housing 172 of the band brake assembly 170 may take different forms or shapes such as axially shorter or longer or with a uniform outside diameter and the configuration illustrated should be understood to be exemplary and not limiting.

The cylindrical housing 172 includes a fully circumferentially extending outer annular friction surface 180 which is generally surrounded by a brake band 182. The brake band 182 includes clutch or brake friction material 184 on its inner surface facing and adjacent the outer friction surface 180 of the cylindrical housing 172. One end of the brake band 182 is secured to the transmission housing 152 by a suitable attachment device or fastener 185 and the other end includes a lug or ear 186 which is engaged by a shaft, rod or output member 188 of a bi-directional linear actuator 190. The linear actuator 190, which may be hydraulically, electrically or pneumatically operated, may be under the control of a transmission control module (TCM) or similar engine or vehicular controller (all not illustrated) which controls the action of the actuator 190 and tightens the brake band 182 about the friction surface 180 of the cylindrical housing 172 to terminate or inhibit rotation of the housing 172 and any coupled or connected component or components and relaxes the brake band 182 to allow rotation thereof.

The cylindrical housing 172 is fabricated of aluminum such as 5052 or 6061 aluminum or a similar alloy and the outer annular friction surface 180 of the cylindrical housing 172 includes an electro ceramic coating 194 which is applied according to the process described below. The electro ceramic coating 194 on the housing 172 may be polished or finished, both as needed and depending upon the thickness of the ceramic coating 194, in order to obtain a required surface finish. The approximate finished thickness of the ceramic coating 194 is 0.005 to 0.050 mm. (0.000197 to 0.00197 inches) but it may be thicker or thinner. The cylindrical housing 172 of the band brake assembly 170 thus provides the weight saving and low inertia advantages of aluminum as well as improved durability and service life.

Figure 10:
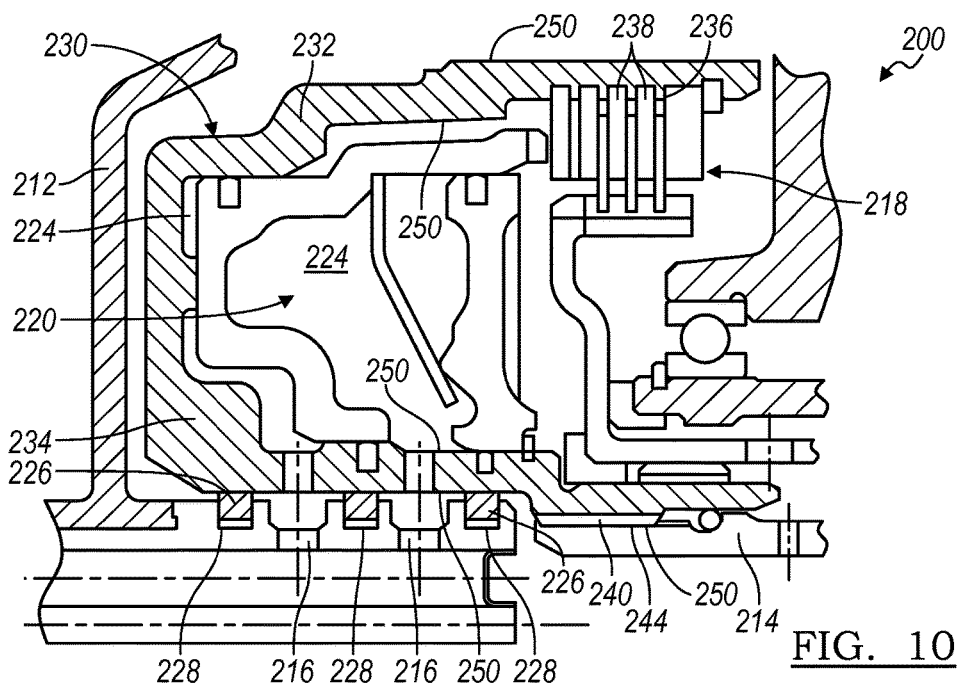
FIG. 10 is a full sectional view of a portion of an automatic transmission including an aluminum clutch housing or support having an electro ceramic coating on its interior and exterior surfaces according to the present invention.

Referring now to FIG. 10, another portion of a motor vehicle automatic transmission is illustrated and generally designated by the reference number 200. The automatic transmission 200 includes a housing 212, a rotating shaft or quill 214, a plurality of planetary gear assemblies (not illustrated), a plurality of fluid passageways 216 and a plurality of friction clutch assemblies 218, one of which is illustrated in FIG. 10. The friction clutch assembly 218 includes a balanced hydraulic operator or actuator 220 having hydraulic fluid chambers 224 contained within a unitary aluminum housing and hub assembly 230. The hydraulic fluid chambers 224 are selectively provided with pressurized hydraulic fluid through the fluid passageways 216 to engage and release the friction clutch assembly 218 and transmit torque therethrough. Three resilient seals 226 in corresponding grooves 228 adjacent the fluid passageways 216 tightly seal and isolate the fluid passageways 216 and direct hydraulic fluid to the chambers 224 of the hydraulic operator or actuator 220

A unitary aluminum housing and hub assembly 230 preferably combines into one component an "L" shaped housing portion 232 which extends radially and axially on the outside of the friction clutch assembly 218 and an irregular, generally cylindrical hub portion 234 which extends axially on the inside of the friction clutch assembly 218. The housing portion 232 of the housing and hub assembly 230 includes a plurality of female splines 236 which engage and couple a plurality of reaction plates 238 in the friction clutch assembly 218 to the housing and hub assembly 230. The hub portion 234 of the housing and hub assembly 230 also includes a plurality of female splines 240 which mate with a plurality of complementary male splines 244 on the shaft or quill 214 to transmit torque therebetween. The hub portion 234 further includes bushing and rotating seal surfaces 246 which rotationally and frictionally contact resilient seals 226 and adjacent bushings as well as a thrust surface or shoulder 248.

The pluralities of female splines 236 and 240 as well as the bushing and rotating seal surfaces 246 and the thrust surface or shoulder 248 include an electro ceramic coating 250 which is applied according to the process set forth below. Conveniently and practically, the entire inner and outer surfaces of the unitary aluminum housing and hub assembly 230 may be coated with the electro ceramic coating 250. The electro ceramic coating 250 on the pluralities of female splines 236 and 240 provides a surface that has good surface hardness which withstands mating with a splined steel shaft or clutch plates which are typically steel but could be aluminum with an electro ceramic coating as described above. The approximate thickness of the ceramic coating 250 is 0.005 to 0.050 mm. (0.000197 to 0.00197 inches) but it may be thicker or thinner.

With regard to the electro ceramic coating 250 on the bushing and rotating seal surfaces 246 and the thrust surface or shoulder 248, these surfaces may be polished or finished if needed depending the thickness of the electro ceramic coating 250 in order to obtain the required surface finish. Again, the approximate thickness of the ceramic coating 250 is 0.005 to 0.050 mm. (0.000197 to 0.00197 inches) but it may be thicker or thinner.

The electro ceramic coated unitary aluminum housing and hub assembly 230 combines into a single lightweight and durable aluminum component what was heretofore two components including a steel hub which was riveted to or serrated and press fit onto the housing. Additionally, the unitary aluminum housing and hub assembly 230 provides weight savings in a component that may be retrofit into the same applications and occupies the same or less packaging space.

Figure 11:
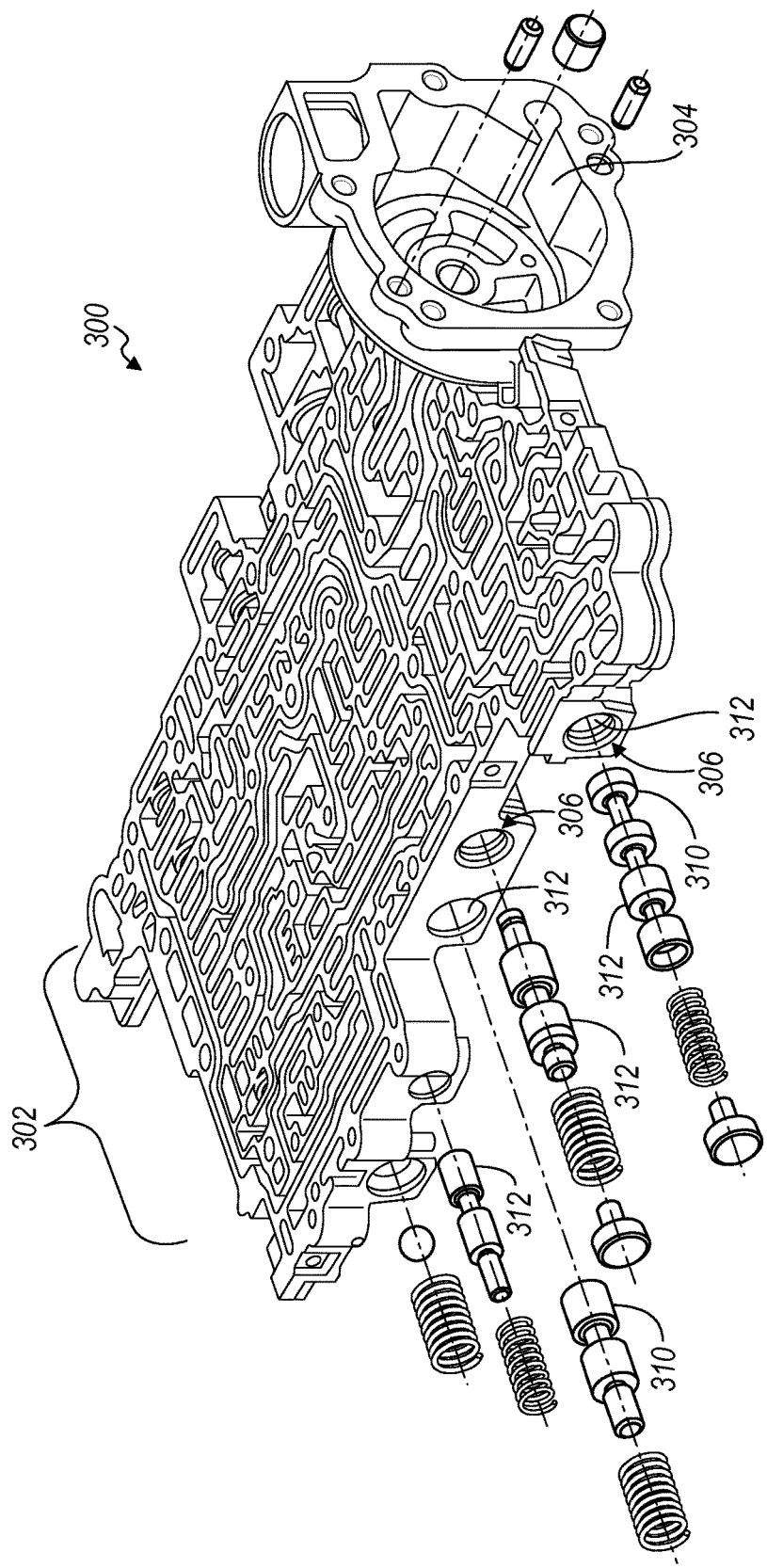
FIG. 11 is a perspective view of a valve body of an automatic transmission including valve bores and valves having an electro ceramic coating on the interior surfaces of the valve bores and the exterior surfaces of the valves according to the present invention.

Referring now to FIG. 11, a typical and exemplary valve body of an automatic transmission is illustrated and generally designated by the reference number 300. The valve body 300 which is secured to the bottom portion of an automatic transmission (not illustrated) is typically cast aluminum and includes myriad ports and passageways 302 which provide fluid communication between, for example, a housing 304 of a hydraulic pump and a plurality of valve bores 306 as well as numerous internal hydraulically controlled and actuated components of the transmission. The plurality of valve bores 306 receive a like plurality of valves or valve spools 310 which are also commonly fabricated of aluminum. The valves or valve spools 310 include an electro ceramic coating 312 over their entire exterior which is applied by the process described below. If desired, the electro ceramic coating 312 may also be applied to the interior surfaces of the valve bores 306 in the valve body 300.

Once again, the approximate thickness of the ceramic coating 312 is 0.005 to 0.050 mm. (0.000197 to 0.00197 inches) but it may be thicker or thinner. Thin (0.005 to 0.006 mm.) and medium (0.010 to 0.012 mm.) thickness ceramic coatings 312 generally will not require secondary finishing for size or surface finish. Thicker ceramic coatings in the range of 0.020 to 0.050 mm. will generally require secondary surface finishing. The electro ceramic coating 312 on the valves 310 and bores 306 of the valve body 300 provides a more durable surface than bare aluminum, eliminates the galling potential existing when both surfaces are bare or untreated aluminum and, because of the surface porosity of the ceramic coating 312, a small amount of oil (hydraulic fluid) is held in the interface between the valve 310 and valve body 300, thereby reducing wear.

Referring now to FIG. 12, a portion of a motor vehicle automatic transmission is illustrated and generally designated by the reference number 350. The automatic transmission 350 includes a friction clutch pack 352 having interleaved friction plates 354 which are splined to an inner hub 356 and reaction plates 358 which are splined to an outer housing 362. The inner hub 356 is coupled to and driven by a hollow shaft or quill 360. The interleaved friction plates 354 and reaction plates 358 are disposed between a backing plate 364 which is splined to and rotates with the housing 362 and an apply plate 366 which is acted upon by a hydraulic actuator or operator 370. The hydraulic actuator 370 is a balanced actuator and includes a circular aluminum piston 372 having an inner resilient seal 373, a first, actuating chamber 374 on one side of the piston 372 and a second, compensating chamber 376 on the opposite side of the piston 372. A first fluid passageway 378 selectively provides hydraulic fluid under pressure to the actuating chamber 372 and a second fluid passageway 382 provides hydraulic fluid to the compensating chamber 374.

An axially stationary complexly curved aluminum circular dam 384 having resilient seals 386 at its inner and outer edges seals the compensating chamber 376. Disposed within the compensating chamber 376 is a circular spring 388 such as a Belleville spring or washer. The spring 388 engages or contacts an inner surface 392 of the piston 372 and a projecting surface 394 of the circular dam 384. Since the spring 388 flexes as the piston 372 translates axially, these regions of contact are wear surfaces and are coated with an electro ceramic coating 396 applied in accordance with the process described below. The approximate thickness of the ceramic coating 396 is 0.005 to 0.050 mm. (0.000197 to 0.00197 inches) but it may be thicker or thinner. The fabrication of the piston 372 and dam 384 of aluminum instead of steel reduces mass and inertia and contributes to improved vehicle fuel economy.

Referring now to FIG. 13, a portion of an automatic transmission, similar to the automatic transmission 10 of FIG. 1, is illustrated and generally designated by the reference number 400. The automatic transmission 400 includes a housing 402 which supports, locates and protects the internal components of the transmission 400 such as a hollow drive shaft or quill 404, a plurality of friction clutch packs 406, one of which is illustrated in FIG. 13, and a plurality of planetary gear assemblies 410, one of which is also illustrated in FIG. 13. The planetary gear assembly 410 includes a sun gear 412, a planet gear carrier 414 and a ring gear 416. The planet gear carrier 414 is fabricated of aluminum and contains a plurality, typically three or four, planet gears 418 which are freely rotatably disposed on stub shafts 422 mounted in the planet gear carrier 414 and in constant mesh with both the sun gear 412 and the ring gear 416. Because the planet gears 418 are helically cut, axial forces are generated as they rotate, thrust washers were often utilized between the planet gears 418 and the planet gear carrier 414. An electro ceramic coating 426, applied according to the process described below, is deposited on faces and shoulders 428 of the planet gear carrier 414 and adjacent and contacting surfaces of the planet gears 418. Additionally, at castle or spline connections 430 between the planet gear carrier 414 and a hub 432 which is coupled to an element such as the outer housing 434 of the planetary gear assembly 406, the engaging faces and preferably sides of the castle or spline connections 430 are coated with the electro ceramic coating 426 applied as described below. On both the faces and shoulders 428 of the planet gear carrier 414, as well as the castle or spline connections 430, the approximate thickness of the electro ceramic coating 426 is 0.005 to 0.050 mm. (0.000197 to 0.00197 inches) but it may be thicker or thinner.

Referring now to FIG. 14, with regard to all of the above delineated aluminum components, the overall process 500 and the individual steps involved in applying the electro ceramic coating will now be described. First, in a step 502 the surface or surfaces of the component are cleaned with a degreasing solution to removes an oils or foreign substances that would interfere with the electro coating process. Next, in a step 504, the component undergoes a first water rinse to remove the degreasing solution. In an optional second rinse step 506, the component may be rinsed with deionized water.

The ceramic coating is applied in a step 510. In the step 510, low voltage direct current is utilized in a plating bath wherein the negative pole is connected to a plate (cathode) submerged in the bath and the positive pole is connected to the aluminum component (anode) to be coated. Preferably, the liquid plating bath has a pH of 2.5 and includes dispersed titanium (Ti). A plasma electrolytic deposition process, typically taking between one and five minutes to achieve the above-stated thickness (0.005 to 0.050 mm.), then occurs in which negative titanium ions acquire $O_2$ molecules and form a coating of titanium dioxide on the surface or surfaces of the component. Typical hardness of such a coating is between 300 and 1400 Hv.

As stated above, the resulting ceramic coating is porous and thus may contain lubricating oil or air which improves component life and operation and reduces sliding friction. After the desired thickness of the ceramic (titanium dioxide) coating has been achieved, the component is removed from the plating bath and rinsed in a step 512. A final step 514 involves drying the component which is then ready for inventorying or movement to a production line.

The description of the invention is merely exemplary in nature and variations that do not depart from the gist of the invention are intended to be within the scope of the invention. Such variations are not to be regarded as a departure from the spirit and scope of the invention.

What is claimed is:

1. A component for a friction clutch pack assembly comprising, in combination,
    a circular plate having a center opening, said circular plate having a first side surface and a second side surface and said circular plate having an inner edge and an outer edge,
    one of said inner and outer edges having a plurality of radially extending splines, and
    said circular plate fabricated of aluminum and having an electro ceramic coating directly on said first side surface and said second side surface.

2. The component for the friction clutch pack assembly of claim 1 wherein said circular plate is one of an apply plate and a reaction plate and said plurality of splines are continuous and disposed on said outer edge.

3. The component for the friction clutch pack assembly of claim 1 wherein said circular plate is one of an apply plate and a reaction plate and said plurality of splines are continuous and disposed on said inner edge.

4. The component for the friction clutch pack assembly of claim 1 wherein said circular plate is one of an apply plate and backing plate fabricated of powdered aluminum and said plurality of splines are continuous and disposed on said outer edge.

5. The component for the friction clutch pack assembly of claim 1 wherein said electro ceramic coating has a thickness of from approximately 0.005 mm. to approximately 0.050 mm.

6. The component for the friction clutch pack assembly of claim 1 wherein said circular plate is a friction plate having friction material on at least one of said side surfaces.

7. The component for the friction clutch pack assembly of claim 1 wherein said circular plate is a reaction plate having friction material on one of said side surfaces.

8. A component for a friction clutch pack assembly for a motor vehicle automatic transmission comprising, in combination,
    a circular plate having a center opening, said circular plate having a first face and a second face, and said circular plate having an inner edge and an outer edge,
    one of said inner and outer edges of said circular plate having a continuous plurality of radially extending splines, and
    said circular plate fabricated of aluminum and having an electro ceramic coating applied directly on said first face and said second face.

9. The component for the friction clutch pack assembly for the motor vehicle automatic transmission of claim 8 wherein said circular plate is one of an apply plate and a reaction plate and said plurality of splines are disposed on said outer edge.

10. The component for the friction clutch pack assembly for the motor vehicle automatic transmission of claim 8 wherein said circular plate is one of an apply plate and a reaction plate and said plurality of splines are disposed on said inner edge.

11. The component for the friction clutch pack assembly for the motor vehicle automatic transmission of claim 8 wherein said circular plate is one of an apply plate and backing plate fabricated of powdered aluminum and said plurality of splines are disposed on said outer edge.

12. The component for the friction clutch pack assembly for the motor vehicle automatic transmission of claim 8 wherein said electro ceramic coating has a thickness of from approximately 0.005 mm. to approximately 0.050 mm.

13. The component for the friction clutch pack assembly for the motor vehicle automatic transmission of claim 8 wherein said circular plate is a friction plate having friction material on at least one of said faces.

14. The component for the friction clutch pack assembly for the motor vehicle automatic transmission of claim 8 wherein said circular plate is a reaction plate having friction material on one of said faces.

* * * * *